G. W. LANCASTER.
SHUTTER OPERATING MECHANISM.
APPLICATION FILED MAR. 5, 1913.
1,087,786.
Patented Feb. 17, 1914.
2 SHEETS—SHEET 1.
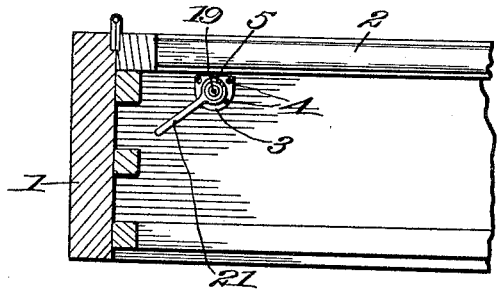
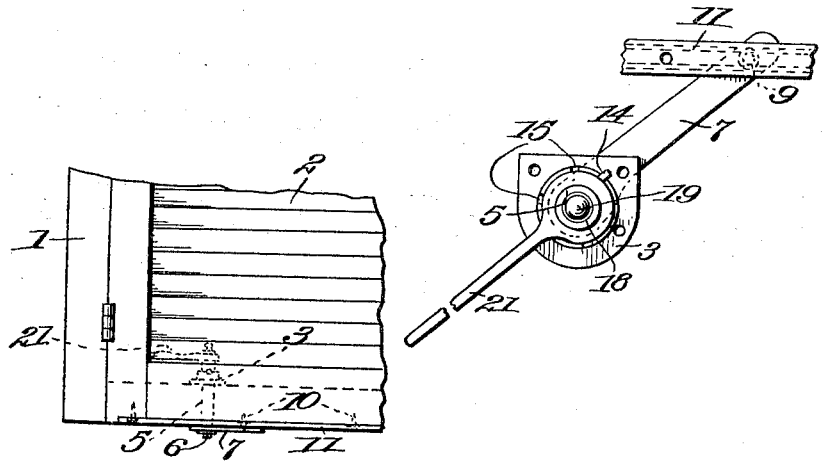
Inventor,
George W. Lancaster,
By Richard B. Owen,
Attorney.
Witnesses
S. P. Marston G. W. LANCASTER.
SHUTTER OPERATING MECHANISM.
APPLICATION FILED MAR. 5, 1913.
1,087,786.
Patented Feb. 17, 1914.
2 SHEETS—SHEET 2.
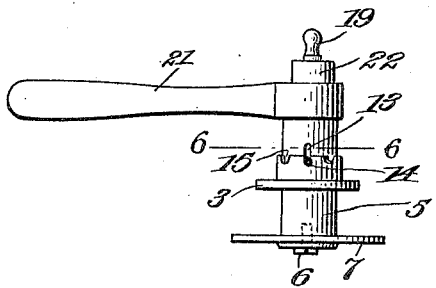
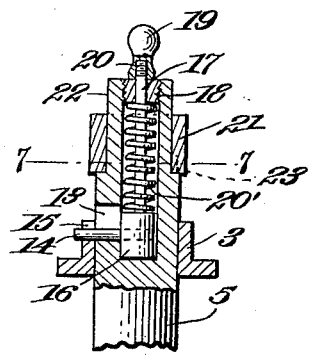
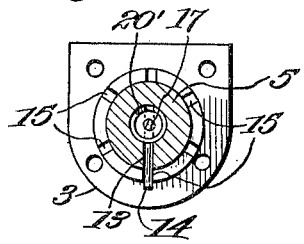
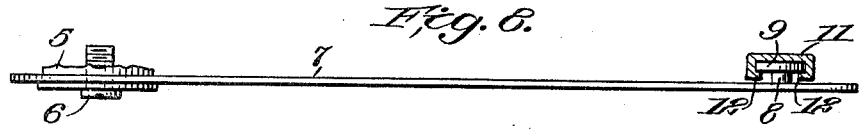
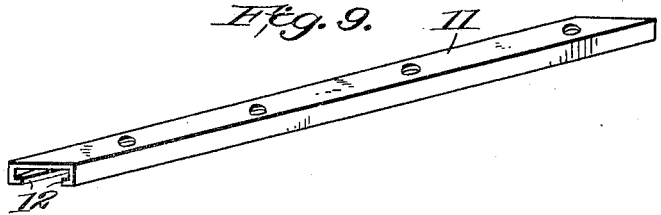

UNITED STATES PATENT OFFICE.

GEORGE W. LANCASTER, OF RICHMOND, VIRGINIA, ASSIGNOR TO UNIVERSAL SCREEN & BLIND COMPANY, INCORPORATED, A CHARTERED COMPANY OF VIRGINIA.

SHUTTER-OPERATING MECHANISM.

1,087,786.

Specification of Letters Patent.

Patented Feb. 17, 1914.

Application filed March 5, 1913. Serial No. 752,056.

*To all whom it may concern:*

Be it known that I, GEORGE W. LANCASTER, a citizen of the United States, residing at Richmond, in the county of Henrico and State of Virginia, have invented certain new and useful Improvements in Shutter-Operating Mechanism, of which the following is a specification.

My invention relates to shutter operating mechanism or more specifically to mechanism for opening and closing shutters.

One object of the invention is to provide means for this purpose operable by means of a horizontally disposed lever, or handle.

Another object of the invention is to provide means whereby the shutter may be fastened in various adjusted positions so that the extent of the window space closed may be regulated.

Still another object of the invention is to provide means in connection with the means operated by the lever, to effect said fastening of the shutter in adjusted positions.

A further object of the invention is to provide means whereby the operating handle or lever employed may be shifted when not in use so as not to interfere with the proper working of the adjacent window sash.

Still other objects of the invention are to provide such means of a simple nature so that the parts can be manufactured at small cost, and to provide the parts of such construction that they will prove durable and efficient in use.

Other objects will appear hereinafter from the description following taken in connection with the accompanying drawings.

The preferred embodiment of the invention is described and illustrated in said drawings, wherein, Figure 1 is a fragmentary horizontal sectional view taken through a window-frame and shutter showing the device of the present invention in connection therewith; Fig. 2 is an elevation showing fragmentarily, parts of a shutter, window-frame and my improved device, taken from the exterior; Fig. 3 is a plan view of the device attached from a window-frame and shutter; Fig. 4 is an elevation of the improved device; Fig. 5 is a vertical sectional view through the parts of Fig. 4; Fig. 6 is a cross sectional view on the line 6—6 of Fig. 4; Fig. 7 is a cross sectional view on the line 7—7 of Fig. 5; Fig. 8 is an edge view of the shifting link or arm, and the parts connecting the same to the shutter; and Fig. 9 is a perspective view of the channel or controlling member.

Referring specifically to the drawings, 1 designates a window frame, or other stationary member and 2 designates a shutter or other hinged member adapted to be swung relatively to the member 1. To the window frame, as to the sill thereof, is fastened a bearing member 3 by means of screws or the equivalent at 4. In this bearing member is journaled a post or turnable shaft 5, to the lower end of which is rigidly fastened as by means of a set screw 6, a shifting link or arm 7. Adjacent the outer end of the shifting link or arm is fastened a guide stud device consisting of a shank 8 having thereon a head 9 off set from the link.

The shutter has fastened thereto, as by means of screws 10, specifically at the lower end thereof, a channeled or grooved guide or control member 11, into the groove of which head 9 slidably extends, being positively coupled thereto by means of the flanges 12 of said control member. The shaft 5 is provided with an elongated slot 13 in which is located a suitable lock member or pin 14. Said shaft is also provided with a central, longitudinal bore or recess in which is mounted the shifting mechanism for the lock pin member. This lock pin or member projects beyond the shaft and is adapted to engage either of a plurality of notches such as 15 provided at the upper edge of the bearing member 3. The pin is specifically carried by a head 16 of a slidable, shifting stem or member 17. To suitable screw threads provided in the bore is screwed a plug 18 through which the stem 17 slidably extends. Beyond the said plug a knob or grip member 19 is preferably attached as by means of screw threads at 20. Surrounding the stem 17 in the bore intermediate the head 16 and plug 18 is mounted a coil or compression spring 20′ which normally forces the pin 14 toward the notches.

An operating handle or lever 21 is slidably mounted vertically on a circumferential or rounded portion 22 of the shaft or post 5 and is coupled thereto to turn therewith as a unit by the engagement of a projection or rib 23 on the post engaging slidably in a slot 24 of the handle or lever. It will be noted that the rounded portion 22 of the shaft 5 is provided by reducing the shaft or post at its upper end, which reduction forms an annular shoulder such as shown, and upon which the lever 21 normally rests. Through the vertical movement of the handle, it can be raised on the post to disengage the projection 23, whereby the handle or lever may be turned independently of the post for the purpose later to be set forth.

In use the operating handle is normally in position where the projection 23 and slot 24 are in engagement. While in such position, in order to open the shutter, the knob 19 is pulled vertically which effects shifting of the pin 14 and raises the same from engagement with the notches 15, whereupon the handle is turned and by the engagement of head 9 on link 5 with control member 11, the shutter is opened to the desired extent. When the shutter has been fully opened or opened to the desired extent, knob 19 is released and thereupon spring 20′ forces the pin 14 into the adjacent notch of the plurality of notches at 15. In use it has been found that the desirable size of the operating handle or lever is sometimes too long to permit the adjacent window sash to close after opening of the shutters. In order to render the handle capable of movement to the position where it will not interfere with the closing of the shutter, the parts have been so constructed that the handle may be raised to disengage the pin 14 and notches 15. After such disengagement, the handle can be freely turned to any desired position for location. In order to close the shutters, the knob 19 is of course raised to disengage pin 14 and notches 15, so that the operating handle can be thereafter swung or shifted to effect closing. After effecting closing, the shutter is locked in such position by the engagement of the pin 14 and proper notch 15.

Changes such as may be made within the spirit and scope of the appended claims are reserved.

Having thus described my said invention, what I claim is:—

1. In combination with a member to be swung, a turnable member, a shifting arm on said turnable member for said first member, a handle on said turnable member, a lock member separate from said handle mounted slidable independently of the handle on said turnable member, and a second lock member engaged by said lock member.

2. In combination with a member to be swung, a turnable member, a bearing member for said turnable member provided with a plurality of notches, a shifting arm on said turnable member for said first member, a handle on said turnable member, and a lock member slidably mounted on said turnable member engageable with said notches.

3. In combination with a member to be swung, a turnable member, a shifting arm on said turnable member for said first member, a lock member, said turnable member provided with an elongated slot through and beyond which said lock member extends, a second lock member engaged by said lock member, and a stem carrying said first lock member slidably mounted on said turnable member.

4. In combination with a member to be swung, a turnable member, a bearing for said turnable member provided with a plurality of notches, a shifting arm on said turnable member for said first member, a spring-pressed locking device mounted on said turnable member having a lock member engageable with said notches, said turnable member provided with an elongated slot through and beyond which said lock member extends, and an adjustable handle mounted on said turnable member.

5. In combination with a member to be swung, a control member fastened thereto, a turnable member, a shifting arm on said turnable member in operative relation with said control member, a bearing member for said turnable member provided with a plurality of notches, a slidable stem in said turnable member having a lock member thereon engageable with said notches, a spring surrounding said stem, a plug member in said turnable member engaging said spring, an adjusting member for said stem exterior of said turnable member, and a handle mounted on said turnable member.

In testimony whereof I have affixed my signature in presence of two witnesses.

GEORGE W. LANCASTER.

Witnesses:
 ROXIE G. SKILES,
 M. E. JONES, Jr.

---

Copies of this patent may be obtained for five cents each, by addressing the "Commissioner of Patents, Washington, D. C."